United States Patent Office 3,304,231
Patented Feb. 14, 1967

3,304,231
PROCESS OF CONTROLLING VIRAL ACTIVITY
WITH PACTAMYCIN
Charles G. Smith, Kalamazoo, Mich., assignor to The
Upjohn Company, Kalamazoo, Mich., a corporation
of Delaware
No Drawing. Filed Feb. 10, 1966, Ser. No. 526,349
5 Claims. (Cl. 167—65)

This application is a continuation-in-part of application Serial No. 283,972, filed May 29, 1963, now abandoned.

This invention relates to a method of suppressing virus activity.

It has been found that virus activity in a system actively producing virus is suppressed by causing the introduction of pactamycin (Bhuyan et al., Antib. Agents and Chemotherap. 1961: 184; Argoudelis et al., 1961: 191) into the virus growth environment. Significant reductions in virus titers have been obtained with extremely low concentrations of this compound in representative tests. By use of the present process virus activity can be controlled in the presence of growing cells. The antiviral properties of pactamycin make it useful especially in the decontamination of infected tissue culture cell lines.

The following examples illustrate the process of this invention but are not to be construed as limiting the scope thereof.

Example 1

The inhibition of herpes virus multiplication by pactamycin was determined by the method of Salzman (Virology 10: 150 [1960]). Chick embryo cells were prepared by the usual method. Monolayers were used within 24 hours after planting about $3 \times 10^7$ cells in 10 ml. of medium on a 100-mm. plastic petri dish. The medium used for the "growth" of monolayers consisted of Hanks' balanced salt solution (BSS) (Proc. Soc. Exptl. Biol. and Med., 71: 196 [1949]) containing 0.5% lactalbumin hydrolysate with 20% calf serum. The monolayers were washed with Hanks' BSS and infected with 0.5 ml. of herpes. After allowing one hour for absorption at 37° C., 9 ml. of Eagle's complete medium (Science 122: 501 [September] 1955) with 10% calf serum (heat inactivated at 56° C. for 30 minutes) and 1 ml. of pactamycin in Hanks' BSS were added to the infected monolayers. The supernatant fluids were removed after incubation for 24 hours, diluted in Hanks' BSS containing 0.5% lactalbumin hydrolysate and plated against chick kidney monolayers for estimation of virus activity by the method of Dulbecco (Proc. Natl. Acad. Sci. U.S. 38: 747 [1952]). Results were as follows:

| Concentration, γ/ml. | Plaque-forming units per 0.5 ml. | |
|---|---|---|
| | Treated | Controls |
| 1.0 | 0 | $3.5 \times 10^4$ |
| 0.1 | 0 | $3.5 \times 10^4$ |
| 0.01 | $7 \times 10^1$ | $3.5 \times 10^4$ |

The foregoing test results show striking activity at extremely low concentrations of pactamycin.

Example 2

The antiviral activity of pactamycin against vaccinia, herpes, PR–8 and Newcastle was determined by the method of Siminoff (App. Microbiol. 9: 66 [1961]). A monolayer of chick kidney cells prepared in a manner similar to the chick embryo monolayers in Example 1 was infected with 0.5 ml. of each virus. After a 60-minute period for adsorption of the virus, 2.6 ml. of nutrient agar was added to each plate. To test for antiviral activity, a sterile 6.5-ml. filter disc saturated with the solution of pactamycin was placed on the agar surface. Four discs were used per plate. After 20 minutes for diffusion, a second nutrient agar layer of 6 ml. was added. The plates were stored in the gassed incubator for 72 hours and then stained for 2 hours with 5 ml. of a 1:10,000 solution of neutral red in Earle's balanced salts solution (J. Exptl. Med. 99: 183–199 [1954]), the stain was drawn off into a trap containing mercocresols and the plates observed for plaque suppression and toxicity to the host cells.

Results were as follows:

| Monolayer | Concentration pactamycin, mg./ml. | Vaccinia | Herpes | PR–8 | Newcastle disease virus |
|---|---|---|---|---|---|
| Chick kidney | 0.1 | 38 | | 34 | 32 |
| Do | 1.0 | | 46 | | |

In assessing the antiviral spectrum of pactamycin, it is noted that significant action was shown against both DNA-containing viruses (e.g., vaccinia and herpes) as well as against RNA-containing viruses (e.g., Newcastle disease virus and PR–8). The method of this invention is directed to activity against both RNA and DNA viruses broadly.

The aforesaid antiviral properties make pactamycin useful in the presence of other virus-susceptible cells, for example, against plant viruses such as tobacco mosaic virus, cucumber mosaic virus and lucerne mosaic virus. Application to the locale of propagation of the virus, for example, by spraying with an aqueous suspension of pactamycin, causes a delay in development of these viruses.

Example 3

Tobacco plants were sprayed with an aqueous suspension containing 0.1% of pactamycin, both before and after inoculation with tobacco mosaic virus. Delay in development of the virus was attained.

Example 4

Cucumber plants were sprayed with an aqueous suspension containing 0.1% of pactamycin, both before and after incoulation with cucumber mosaic virus. Delay in development of the virus was attained.

Example 5

Nicotiana glutinosa plants were sprayed with an aqueous suspension containing 0.1% of pactamycin, both before and after inoculation with lucerne mosaic virus. Delay in development of the virus was attained.

The foregoing examples show that a sufficient amount of pactamycin for inhibition of interaction of the virus and host cells susceptible thereto provides unexpected beneficial results. When subjected to such amount, the virus fails to proliferate; its infectiousness being effectively inhibited.

What is claimed is:
1. The method of controlling vaccinia viral activity in a tissue culture which comprises applying to the virus an inhibitory amount of pactamycin.
2. The method of controlling herpes viral activity in a tissue culture which comprises applying to the virus an inhibitory amount of pactamycin.
3. The method of controlling PR–8 viral activity in a tissue culture which comprises applying to the virus an inhibitory amount of pactamycin.

4. The method of controlling Newcastle disease viral activity in a tissue culture which comprises applying to the virus an inhibitory amount of pactamycin.

5. The method of controlling viral activity in growing plants which comprises applying to the plants an effective amount of pactamycin for viral inhibition.

References Cited by the Examiner
UNITED STATES PATENTS
3,183,154   5/1965   Argoudelis et al. _____ 167—65

ELBERT L. ROBERTS, *Primary Examiner.*

R. L. HUFF, *Assistant Examiner.*